(12) United States Patent
Park

(10) Patent No.: US 7,377,681 B2
(45) Date of Patent: May 27, 2008

(54) BACKLIGHT UNIT AND LIQUID CRYSTAL DISPLAY DEVICE HAVING THE SAME

(75) Inventor: Hee-Jeong Park, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/280,732

(22) Filed: Nov. 17, 2005

(65) Prior Publication Data

US 2006/0146570 A1    Jul. 6, 2006

(30) Foreign Application Priority Data

Dec. 31, 2004    (KR) .................. 10-2004-0118366

(51) Int. Cl.
*F21V 7/04*    (2006.01)

(52) U.S. Cl. ............... 362/613; 362/606; 362/612; 362/614; 362/615; 362/227; 362/616

(58) Field of Classification Search ............ 362/606, 362/615, 618, 620, 227, 228, 229, 29, 30, 362/225, 27, 612–614, 97

See application file for complete search history.

(56) References Cited

U.S. PATENT DOCUMENTS

| 5,143,433 | A | * | 9/1992 | Farrell | 362/29 |
| 5,479,275 | A | * | 12/1995 | Abileah | 349/5 |
| 5,975,722 | A | * | 11/1999 | Van Duijneveldt | 362/296 |
| 6,039,451 | A | * | 3/2000 | Grave | 362/29 |
| 6,508,576 | B2 | * | 1/2003 | Emmelmann et al. | 362/543 |
| 2005/0135115 | A1 | * | 6/2005 | Lamb et al. | 362/613 |
| 2007/0058393 | A1 | * | 3/2007 | Kim et al. | 362/613 |
| 2007/0081321 | A1 | * | 4/2007 | Ahn et al. | 362/97 |

FOREIGN PATENT DOCUMENTS

CN    1512230 A    7/2004

* cited by examiner

*Primary Examiner*—Ali Alavi
*Assistant Examiner*—Evan Dzierzynski
(74) *Attorney, Agent, or Firm*—Seyfarth Shaw LLP

(57) ABSTRACT

A backlight unit for a liquid crystal display device includes a first light-emitting unit having first and second passive light-emitting lamps; a second light-emitting unit having a plurality of self light-emitting lamps; and a light guide disposed between the first and second light-emitting units guiding an incident light from the second light-emitting unit to the first light-emitting unit.

24 Claims, 4 Drawing Sheets

BACKLIGHT UNIT AND LIQUID CRYSTAL DISPLAY DEVICE HAVING THE SAME

The present invention claims the benefit of Korean Patent Application No. 10-2004-118366 filed in Korea on Dec. 31, 2004, which is hereby incorporated by reference in its entirety.

BACKGROUND OF THE INVENTION

1. Field of the Invention

The present invention relates to a liquid crystal display (LCD) device and, more particularly, to a backlight unit for an LCD device.

2. Discussion of the Related Art

In general, an LCD device includes a thin film transistor (TFT) array substrate, a color filer substrate, a liquid crystal display panel, a driving unit for driving the liquid crystal panel, and a backlight unit for supplying light to the liquid crystal panel. The thin film transistor (TFT) array substrate and the color filer substrate face each other. The liquid crystal display panel includes a first substrate, a second substrate, and a liquid crystal layer formed between the first and second substrates.

The TFT array substrate includes a plurality of data lines crossing a plurality of gate lines to form a matrix. The data lines are vertically arranged with a specified interval therebetween. The gate lines are horizontally arranged with a specified interval therebetween. Each crossing of the data line and the gate line defines a pixel region.

The color filter substrate includes red, green and blue color filter layers formed at positions corresponding to the pixel regions. A black matrix is provided on the color filter substrate. The black matrix prevents light leakage between the color filter layers and color interference of light passing through the pixel regions.

A common electrode and a pixel electrode are formed at facing inner surfaces of the color filter substrate and the TFT array substrate, respectively. The pixel electrode is formed on the TFT array substrate to correspond to each pixel region. The common electrode is integrally formed on the entire surface of the color filter substrate.

The backlight unit supplies light to the LCD device, which cannot emit light by itself. When light emitted from the backlight unit propagates through the liquid crystal layer, the light transmittance depends on the arrangement of the liquid crystal molecules in the liquid crystal layer. The light transmittance of the liquid crystal molecules is controlled by applying a voltage difference between the common electrode and the pixel electrode to generate an electric field in the liquid crystal layer therebetween. To display a desired image, the light transmittance of each pixel region can be controlled by controlling the voltage difference applied between the pixel electrode and the common electrode to change the arrangement of liquid crystal molecules in the liquid crystal layer.

The backlight unit requires lamps as light sources. Depending on the position of the lamps, the backlight unit is classified as an edge type backlight unit or a direct type backlight. In the edge type backlight unit, lamps are disposed at one side or both sides of the liquid crystal panel. Light generated from the lamps is projected on the entire screen of the liquid crystal panel by a light guide plate.

The direct type backlight unit has been actively developed to cope with the increase in the size of liquid crystal panels, which is growing to larger than 20 inches. In the direct type backlight unit, a plurality of fluorescent lamps are arranged in a row and irradiate light directly onto the entire surface of the liquid crystal panel. The direct type backlight unit is more efficient in light usage than the edge type backlight unit, and is commonly used to provide high luminance for large-screen LCD devices.

The backlight unit can use Cold Cathode Fluorescent Lamps (CCFL), Hot Cathode Fluorescent Lamps (HCFL), Electro-Luminescence (EL), Light Emitting Diodes (LED), and the like, as light sources. CCFL and the LED lamps are commonly used. However, although the fluorescent lamps can provide high luminance and improve luminance uniformity, they do not readily lend themselves to high color reproduction. In addition, although the LED or the EL lamps are amenable to use for high color reproduction, but they have low luminance and low luminance uniformity compared with the CCFL.

SUMMARY OF THE INVENTION

Accordingly, the present invention is directed to a backlight unit and a liquid crystal display device having the same that substantially obviate one or more of the problems due to limitations and disadvantages of the related art.

An object of the present invention is to provide a backlight unit having high luminance and high color reproduction for an LCD device.

Another object of the present invention is to provide an LCD device having high luminance and high color reproduction capabilities.

To achieve these and other advantages and in accordance with the purpose of the present invention, as embodied and broadly described herein, a backlight unit for a liquid crystal display device includes a first light-emitting unit having first and second passive light-emitting lamps; a second light-emitting unit having a plurality of self light-emitting lamps; and a light guide disposed between the first and second light-emitting units guiding an incident light from the second light-emitting unit to the first light-emitting unit.

In another aspect, a backlight unit for an LCD device includes a first light-emitting unit having a plurality of passive light-emitting lamps; a second light-emitting unit provided at a first side of the first light-emitting unit and having a plurality of self light-emitting lamps; a light guide plate interposed between the first and second light-emitting units for guiding incident light from the second light-emitting unit to the first light-emitting unit; a reflection plate provided at a first side of the second light-emitting unit; and a light scattering unit provided at a second side of the first light-emitting unit.

In another aspect, a liquid crystal display device, comprising a liquid crystal panel and a backlight unit for supplying light to the liquid crystal panel, wherein the backlight unit includes a first light-emitting unit having a plurality of passive light-emitting lamps; a second light-emitting unit provided at a first side of the first light-emitting unit and having a plurality of self light-emitting lamps; a light guide plate interposed between the first and second light-emitting units for guiding incident light from the second light-emitting unit to the first light-emitting unit; a reflection plate provided at a first side of the second light-emitting unit; and a light scattering unit provided at a second side of the first light-emitting unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
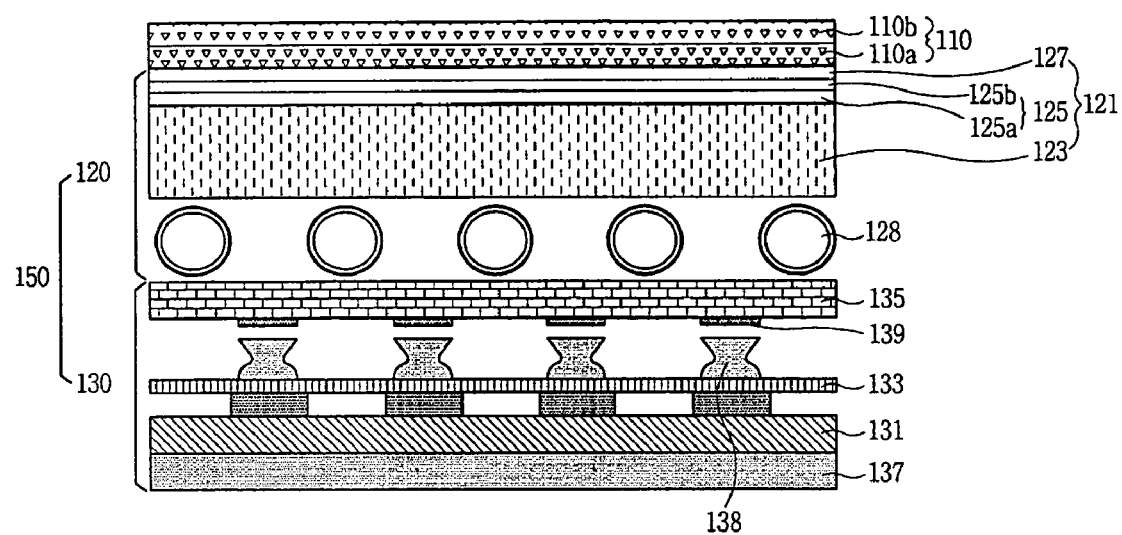
FIG. 1 shows an exemplary cross-sectional view of a liquid crystal display device according to an embodiment of the present invention.

FIG. 1 shows an exemplary cross-sectional view of a liquid crystal display device in accordance with an embodiment of the present invention. Referring to FIG. 1, the LCD device includes a liquid crystal panel 110 and a backlight unit 150 for supplying light to the liquid crystal panel 110. The liquid crystal panel 110 includes a thin film transistor (TFT) array substrate 110a and a color filter substrate 110b attached to each other. A liquid crystal layer (not shown) is provided between the TFT array substrate 110a and the color filter substrate 110b.

Gate lines (not shown) are arranged in a first direction on the TFT array substrate 110a. Data lines vertically cross the gate lines to define a matrix of pixel regions on the TFT array substrate 110a. A switching device is provided at each pixel region. Red, green and blue color filter layers, also not shown, are formed on the color filter substrate to correspond with the pixel regions. A black matrix (not shown) is also provided to prevent light leakage between the color filter layers and color interference of light propagating through the pixel regions.

A pixel electrode (not shown) and a common electrode (not shown) are formed at inner surfaces of the TFT array substrate and the color filter substrate, respectively, for applying an electric field to the liquid crystal layer. Light transmittance in each pixel region is individually controlled by changing an arrangement state of liquid crystal molecules in the liquid crystal layer by controlling a voltage difference between the common electrode and the pixel electrode.

The backlight unit 150 includes a first light-emitting unit 120 and a second light-emitting unit 130. The first light-emitting unit 120 includes one or more passive light-emitting lamp 128 as a light source. The passive light-emitting lamp 128 of the first light-emitting unit 120 can include a fluorescent lamp, such as a Cold Cathode Fluorescent Lamp (CCFL) or an Hot Cathode Fluorescent Lamp (HCFL). The second light-emitting unit 130 includes one or more self light-emitting lamp 138 as a light source. The self light-emitting lamp 138 of the second light-emitting unit 130 can includes a LED lamp or an EL lamp.

Figure 2:
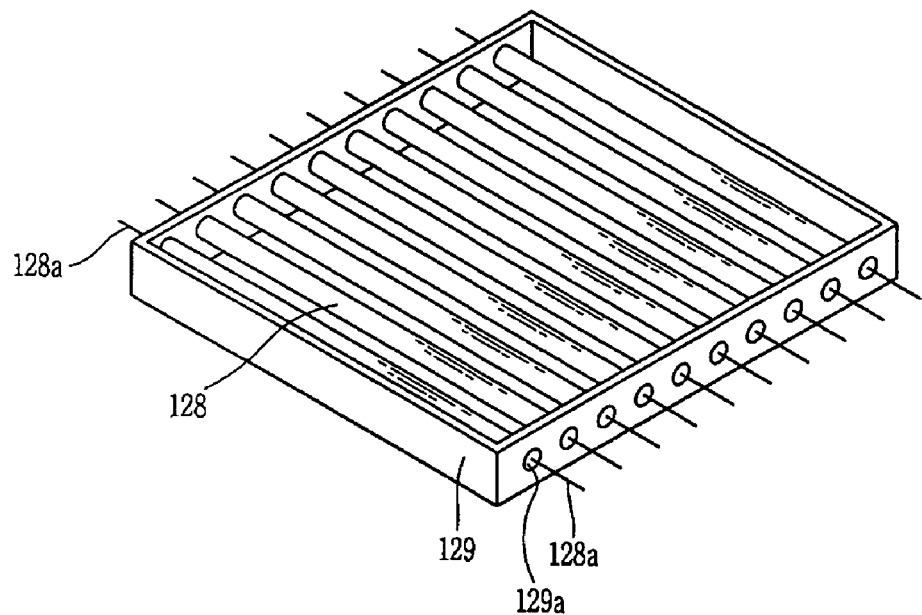
FIG. 2 shows a schematic description of an exemplary first light-emitting unit of a backlight unit according to an embodiment of the present invention.

FIG. 2 shows a schematic description of an exemplary first light-emitting unit of a backlight unit according to an embodiment of the present invention. Referring to FIG. 2, the first light-emitting unit 120 (shown in FIG. 1) includes passive light-emitting lamps 128 disposed in an outer case 129. Adjacent passive light-emitting lamps 128 are separated from each other by a specified interval. The interval between adjacent passive light-emitting lamps 128 can be fixed. Alternatively, the interval between passive light-emitting adjacent lamps 128 may change from one pair of passive light-emitting lamps 128 to the next.

The outer case 129 can be provided with holes 129a on its left and right sides for holding the passive light-emitting lamps 128. The left and right ends of each of the passive light-emitting lamps 128 can be attached to the holes 129a formed at the left and right sides of the outer case 129, respectively. The passive light-emitting lamps 128 can be arranged to irradiate light directly on the liquid crystal display panel to form a direct type backlight unit.

Figure 3:
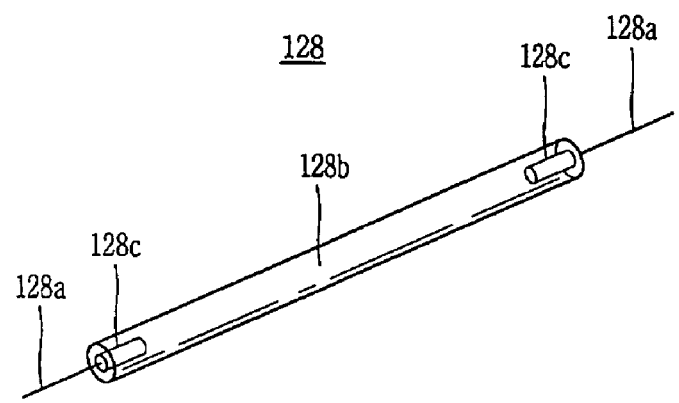
FIG. 3 shows an exemplary passive light-emitting lamp for the first light-emitting unit of FIG. 2.

FIG. 3 shows an exemplary passive light-emitting lamp for the first light-emitting unit of FIG. 2 according to an embodiment of the present invention. Referring to FIG. 3, the passive light-emitting lamp 128 includes a glass tube 128b filled with a charged gas. Electrodes 128c are provided at left and right ends of the glass tube 128b for applying external power (not shown) to the charged gas inside the glass tube 128b. A wire 128a is provided at each of the left and right ends of the glass tube 128b. The wire 128a electrically connects the corresponding electrode 128c to a driving circuit (not shown), such as an inverter, for driving the light-emitting lamp 128.

When a voltage is applied to the wires 128a at the left and right ends of the glass tube 128b, electrons in the glass tube 128b move to an anode of the lamp 128 and collide with argon atoms, thereby exciting the argon gas inside the glass tube 128. Accordingly, the number of positive ions within the charged gas increases. The positive ions in the charged gas collide with a cathode of the lamp 128 to generate secondary electrons. Then, the generated secondary electrons flow within the glass tube and collide with mercury vapor to produce an ionized gas, which emits ultraviolet rays and visible light. The emitted ultraviolet rays excite a fluorescent material coated on an inner wall of the lamps to emit visible rays, thereby generating light.

Referring back to FIG. 1, the first light-emitting unit 120 includes a light scattering unit 121 for enhancing uniformity of light transmitted to the liquid crystal panel 110. The light scattering unit 121 is formed substantially above the passive light-emitting lamps 128. The light scattering unit 121 includes a diffusion plate 123, first and second prism sheets 125a and 125b, and a protection sheet 127. The first and second prism sheets 125b and 125a, and the protection sheet 127 are formed substantially above the diffusion plate 123, respectively. The second prism sheet 125a has a flat second surface and a first surface creased in an inward/outward direction. The first prism sheet 125b has a flat second surface and a horizontally creased first surface.

The diffusion plate 123 scatters incident light from the lamp 128 to avoid generation of a blot due to a partial concentration of light. In addition, the diffusion plate 123 orients light propagating toward the second prism sheet 125a in a direction perpendicular to a surface of the second prism sheet 125a. The second prism sheet 125a collects light propagating toward the first prism sheet 125b in an inward/outward direction. The first prism sheet 125b collects light propagating toward the protection sheet 127 in the horizontal direction. Thus, light propagating toward the protection sheet 127 from the diffusion plate 123 is oriented in a direction perpendicular to the diffusion plate 127. Accordingly, light propagating through the first and second prism sheets 125a and 125b can travel in a direction perpendicular to the surface of protection sheet 127 to be uniformly distributed on the entire surface of the protection sheet 127, thereby enhancing the luminance of the liquid crystal panel.

Figure 4:
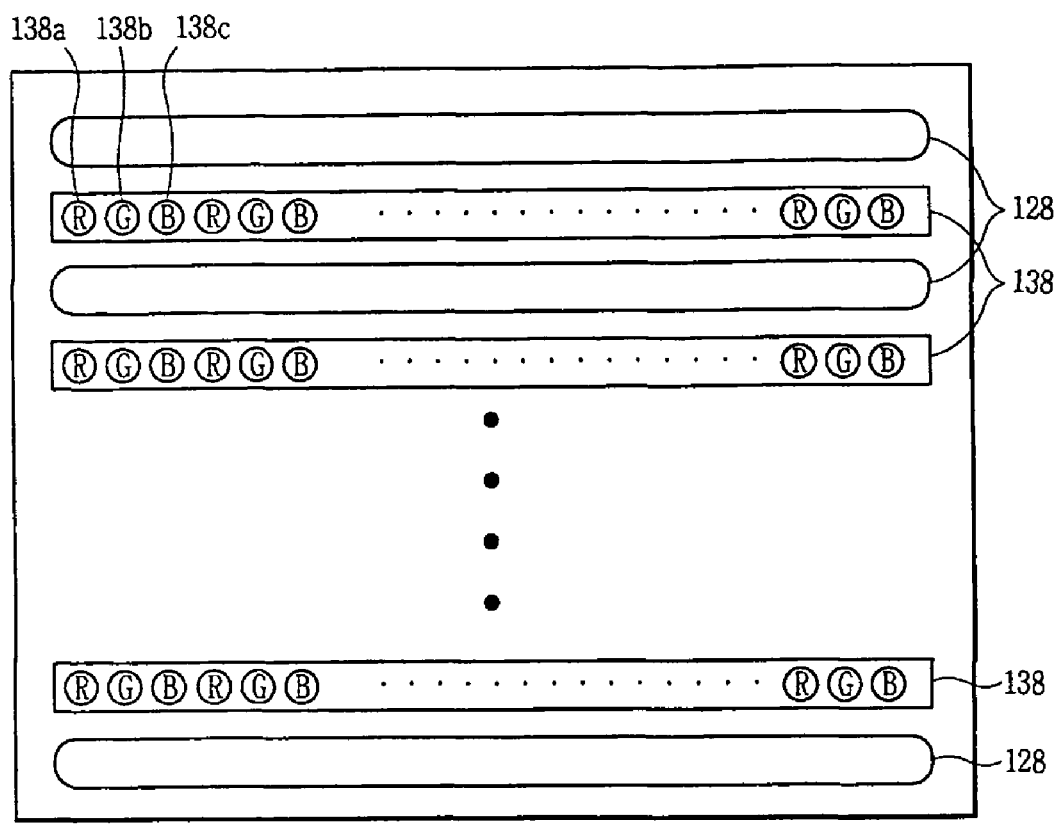
FIG. 4 shows a top view illustrating an exemplary arrangement of the passive light-emitting lamps and the self light-emitting lamps in the first and second light-emitting units according to an embodiment of the present invention.

FIG. 4 shows a top view illustrating an exemplary arrangement of the passive light-emitting lamps and the self light-emitting lamps in the first and second light-emitting units according to an embodiment of the present invention. Referring to FIG. 4, the self light-emitting lamps 138 are disposed between adjacent passive light-emitting lamps 128. The self light-emitting lamps 138 can include red (R), green (G), and blue (B) lamps 138a, 138b and 138c, respectively. Successive R, G, and B lamps 138a, 138b, and 138c are disposed in a repeating pattern to form a row of self light-emitting lamps 138 between adjacent passive light-emitting lamps 128. For example, the self light-emitting lamps 138a, 138b, and 138c can be disposed according to a repeating R-G-B pattern to form a line of self light-emitting lamps 138 between a pair of adjacent passive light-emitting lamps 128. In other embodiments of the present invention, other patterns can also be formed, for example, G-R-B and G-B-R. Accordingly, monochromatic lights emitted respectively from the R, G and B lamps 138a, 138b and 138c are mixed to generate white light. By disposing the self light-emitting lamps 138 between the passive light-emitting lamps 128, shortcomings of the related art LED backlight, such as reduction of luminance due to non-uniformity and LED degradation, are prevented.

Referring back to FIG. 1, the self light-emitting lamps 138 can be formed on a metal core printed circuit board (MCPCB) 131. A reflection plate 133 can be provided at a second side of the self light-emitting lamps 138. The reflection plate 133 can be disposed between the self light-emitting lamps 138 and the MCPCB 131. The reflection plate 133 reflects light incident from the self-emitting lamps 138 toward the liquid crystal panel 110 on the upper portion of the liquid crystal display device. The reflection plate 133 can be made of aluminum (Al), which has excellent reflection characteristics.

The self light-emitting lamp 138, especially the LED lamp, has excellent luminance and color reproduction property compared with the fluorescent lamps, such as CCFL and HCFL. However, the output luminance of the LED lamp 138 decreases as the internal temperature of the LED lamp increases. Thus, a heat releasing plate 137 is provided at a second surface of the MCPCB 131 to receive heat from the lamp 138 and externally discharge the heat to prevent an increase of the internal temperature. Heat generated by the LED lamp 138 is absorbed by the reflection plate 133 and transferred to the MCPCB 131. The heat transferred to the MCPCB 131 is absorbed by the external heat releasing plate 137 and externally discharged.

As shown in FIG. 1, a light guide plate 135 is provided between the first and second light-emitting units 120 and 130. The light guide plate 135 transmits most of the light incident thereto from the self light-emitting lamps 138. The light guide plate 135 is made of a transparent material, such as poly methyl meth-acrylate (PMMA), a glass substrate, and poly-carbonate (PC).

One or more diverter 139 is provided at a first side of the self light-emitting lamps 138. The diverters 139 can be formed at positions corresponding to each of the self light-emitting lamps 138. The diverters 139 laterally scatter light vertically incident from the self light-emitting lamps 138 to improve light uniformity into the light guide unit 135. A portion of light scattered by the diverter 139 is reflected by the reflection plate 133 to be transmitted through the diffusion plate 123. The diverters 139 can be made of a PET or PC resin, for example.

In an embodiment of the present invention, as shown in FIG. 1, the diverters 139 are formed on a second surface of the light guide plate 135. With this arrangement, the self light-emitting lamps 138 are spaced apart from the diverters 139 by an isolation distance to isolate the diverters 139 from the self light-emitting lamps. Accordingly, an even larger spacing is provided between the light guide plate 135 and the self light-emitting lamps 138.

Figure 5:
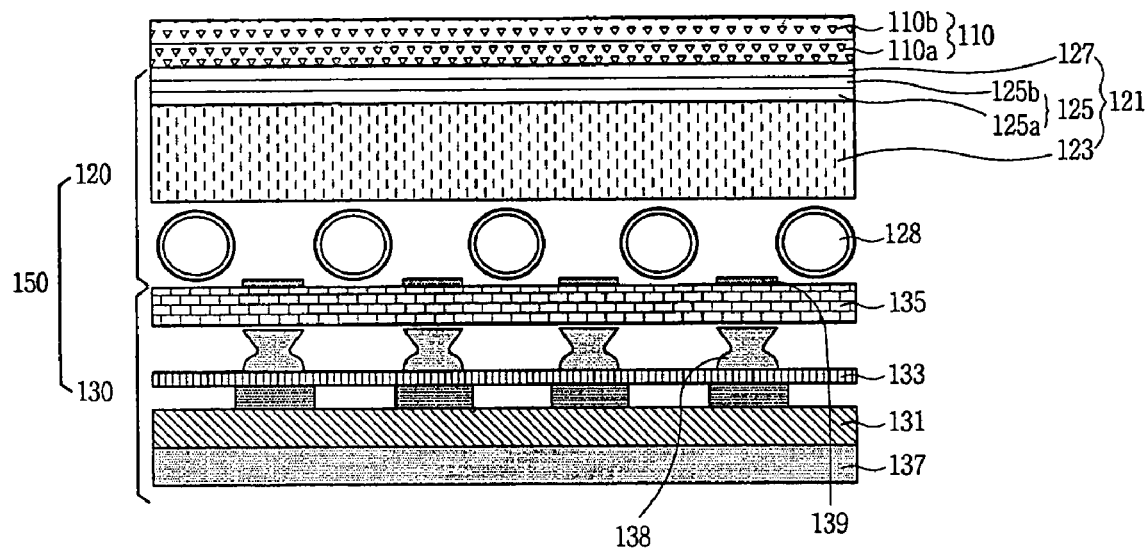
FIG. 5 shows an exemplary cross-sectional view of a liquid crystal display device according to another embodiment of the present invention.

FIG. 5 shows an exemplary cross-sectional view of a liquid crystal display device according to another embodiment of the present invention. Referring to FIG. 5, the diverters 139 can be formed on a first surface of the light guide plate 135. With this arrangement, the isolation distance between the self light-emitting lamps 138 and the diverters 139 is eliminated. Accordingly, the spacing between the light guide plate 135 and the self light-emitting lamps 138 can be reduced. By reducing the distance between the self light-emitting lamps 138 and the light guide plate 135, the overall thickness of the backlight can be reduced.

Figure 6:
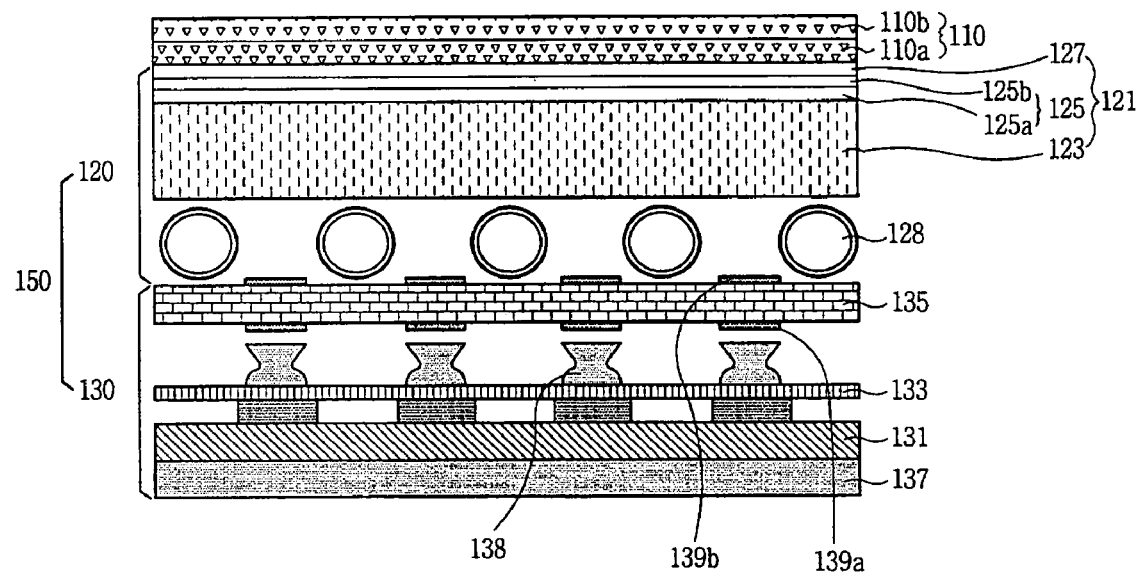
FIG. 6 shows an exemplary cross-sectional view of a liquid crystal display device according to still another embodiment of the present invention.

FIG. 6 shows an exemplary cross-sectional view of a liquid crystal display device according to still another embodiment of the present invention. Referring to FIG. 6, diverters 139a are provided on the second surface of the light guide plate 135. Diverters 139b are also provided on the first surface of the light guide plate 135. By providing diverters 139a and 139b on both second and first surfaces, respectively, of the light guide plate 135, the light efficiency of the backlight unit 150 can be further enhanced.

In accordance with various embodiments of the present invention, the backlight unit includes first and second light-emitting units. The first light-emitting unit includes passive light-emitting lamp, such as the CCFL or the HCFL. The second light-emitting unit includes self light-emitting lamps, such as EL and LED. Accordingly, higher and more uniform luminance can be achieved due to the first light-emitting unit, and control of the luminance and high color reproduction can be achieved due to the second light-emitting unit.

In accordance with various embodiments of the present invention, the backlight unit includes both passive light-emitting lamps, such as the CCFL or the HCFL, and self light-emitting lamps, such as EL or LED. Thus, the LCD device can provide a high picture quality due to the achieved high and uniform luminance and the high color reproduction capabilities.

It will be apparent to those skilled in the art that various modifications and variations can be made in the backlight unit, and the liquid crystal display device having the same, of the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
   a first light-emitting unit having first and second passive light-emitting lamps;
   a second light-emitting unit having a plurality of self light-emitting lamps; and a light guide disposed between the first and second light-emitting units such that most of a light incident onto the light guide from the second light-emitting unit is transmitted to the first light-emitting unit through a whole area of the light guide;

wherein the self light-emitting lamps are disposed between the first and second passive light-emitting lamps.

2. The backlight unit of claim 1, further comprising a diverter disposed at a first side of each of the self light-emitting lamps for laterally scattering light incident from the self light-emitting lamps.

3. The backlight unit of claim 2, further including a reflector disposed at a second side of the self light-emitting lamps for reflecting light incident from the self-emitting lamps toward the light guide.

4. The backlight unit of claim 3, further including a light scattering part provided above the first and second passive light-emitting lamps.

5. The backlight unit of claim 4, wherein each of the first and second passive light-emitting lamps includes a cold cathode fluorescent lamp.

6. The backlight unit of claim 4, wherein each of the first and second passive light-emitting lamps includes a hot cathode fluorescent lamp.

7. The backlight unit of claim 4, wherein each of the self light-emitting lamps includes an electroluminescence lamp.

8. The backlight unit of claim 4, wherein each of the self light-emitting lamps includes a light-emitting diode.

9. The backlight unit of claim 2, wherein the diverter is disposed on a second surface of the light guide means.

10. The backlight unit of claim 2, wherein the diverter is disposed on a first surface of the light guide.

11. The backlight unit of claim 2, wherein the diverter includes a second diverter disposed on a second surface of the light guide and a first diverter disposed on a first surface of the light guide.

12. A backlight unit for an LCD device, comprising:
a first light-emitting unit having a plurality of passive light-emitting lamps;
a second light-emitting unit provided at a lower side of the first light-emitting unit and having a plurality of self light-emitting lamps;
a light guide plate interposed between the first and second light-emitting units such that most of a light incident onto the light guide plate from the second light-emitting unit is transmitted to the first light-emitting unit through a whole area of the light guide plate;
a reflection plate provided at a lower side of the second light-emitting unit; and
a light scattering unit provided at a second side of the first light-emitting unit;
wherein the self light-emitting lamps are disposed between the first and second passive light-emitting lamps.

13. The backlight unit of claim 12, wherein each of the passive light-emitting lamps includes one of a cold cathode fluorescent lamp or a hot cathode fluorescent lamp.

14. The backlight unit of claim 12, wherein each of the self light-emitting lamps includes one of an electro-luminescence lamp or a light-emitting diode.

15. The backlight unit of claim 12, further comprising a plurality of diverters, each diverter disposed at a first portion of a corresponding one of the self light-emitting lamps, the diverters for laterally scattering vertically incident light toward the light guide plate.

16. The backlight unit of claim 15, wherein the diverters are formed on a first surface of the light guide plate.

17. The backlight unit of claim 15, wherein the diverters are formed on a second surface of the light guide plate.

18. The backlight unit of claim 15, wherein the diverters are formed on the first surface and the second surface of the light guide plate.

19. The backlight of claim 12, wherein the light guide plate is made of one of a poly methyl meth-acrylate, a glass substrate, or a poly-carbonate.

20. The backlight unit of claim 12, wherein the light scattering unit includes:
a diffusion plate for distributing light incident from the first and second light-emitting units;
a prism sheet for enhancing a front surface luminance of light reflected after being transmitted to a first portion of the diffusion plate; and
a protection sheet disposed on a first portion of the prism sheet.

21. A liquid crystal display device, comprising a liquid crystal panel and a backlight unit for supplying light to the liquid crystal panel, wherein the backlight unit comprises:
a first light-emitting unit having a plurality of passive light-emitting lamps;
a second light-emitting unit provided at a first side of the first light-emitting unit and having a plurality of self light-emitting lamps;
a light guide plate interposed between the first and second light-emitting units such that most of a light incident onto the light guide plate from the second light-emitting unit is transmitted to the first light-emitting unit through a whole area of the light guide plate;
a reflection plate provided at a first side of the second light-emitting unit; and
a light scattering unit provided at a second side of the first light-emitting unit;
wherein the self light-emitting lamps are disposed between the first and second passive light-emitting lamps.

22. The liquid crystal display device of claim 21, wherein each of the passive light-emitting lamps includes one of a cold cathode fluorescent lamp or a hot cathode fluorescent lamp.

23. The liquid crystal display device of claim 21, wherein each of the self light-emitting lamps includes one of an electro-luminescence lamp or a light-emitting diode.

24. A backlight unit for an LCD device, comprising:
a first light-emitting unit having a plurality of passive light-emitting lamps;
a second light-emitting unit having a plurality of self light-emitting lamps disposed between the passive light-emitting lamps;
a light guide plate interposed between the first and second light-emitting units for transmitting most of a light incident thereto from the second light-emitting unit to the first light-emitting unit through a whole area of the light guide plate; and
a plurality of diverters on a surface of the light guide plate, each diverter directly facing a corresponding one of the self light-emitting lamps, the diverters for laterally scattering vertically incident light toward the light guide plate.

* * * * *